United States Patent [19]
Thornton et al.

[11] Patent Number: 5,413,682
[45] Date of Patent: May 9, 1995

[54] RECOVERY OF FLUORIDE FROM WASTE SOLUTIONS

[75] Inventors: Roy F. Thornton; Bang M. Kim, both of Schenectady, N.Y.; Steven J. Babb; John L. Harmon, both of Wilmington, N.C.

[73] Assignee: General Electric Company, Schenectady, N.Y.

[21] Appl. No.: 218,398

[22] Filed: Mar. 28, 1994

[51] Int. Cl.$^6$ .............................................. B01D 61/44
[52] U.S. Cl. .................................. 204/102; 204/103; 204/182.4; 204/151
[58] Field of Search ...................... 204/102, 103, 182.4, 204/151

[56] References Cited

U.S. PATENT DOCUMENTS 3,450,609  6/1969  Carlin ................................. 204/103
4,394,226  7/1983  Wade et al. ........................... 204/72
4,943,360  7/1990  Sugisawa et al. ................... 204/182.3

OTHER PUBLICATIONS

Y. C. Chiao et al., Bipolar Membranes for Purification of Acids and Bases, Journal of Membrane Science, 16 (1991) pp. 239–252 no month.
K. N. Mani and F. P. Chlanda, Recovery of Spent Mineral Acids Via Electrodialytic Water Splitting, International Technical Conference on Membrane Separation Processes, Brighton, UK, May 24–26, 1989, Paper G2 pp. 235–251.
K. N. Mani et al., Aquatech Membrane Technology for Recovery of Acid/Base Values from Salt Streams, paper presented at the 5th Symposium on Synthetic Membranes in Science and Industry, Sep. 2–5, 1986 pp. 149–168.

*Primary Examiner*—John Niebling
*Assistant Examiner*—Arun S. Phasge
*Attorney, Agent, or Firm*—James Magee, Jr.

[57] ABSTRACT

Fluoride is recovered from an aqueous ammonium fluoride and ammonium hydroxide solution by electrolyzing the solution in an electrochemical cell having an ion-exchange membrane between a catholyte chamber and an anolyte chamber whereby hydrofluoric acid is formed and the concentration of ammonium hydroxide is enriched. Part of the hydrofluoric acid can be combined with the ammonium fluoride remaining after the ammonium hydroxide had been stripped from the treated solution to produce ammonium acid fluoride.

5 Claims, 11 Drawing Sheets

SOLUTION CONCENTRATIONS, TEST No. 2

SOLUTION CONCENTRATIONS, TEST No. 2

TOTAL AMOUNT OF HYDROFLUORIC ACID
IN THE ANOLYTE, TEST No. 2

TOTAL AMOUNT OF AMMONIUM FLUORIDE
IN THE CATHOLYTE, TEST No. 2

TOTAL AMOUNT OF AMMONIUM HYDROXIDE
IN THE CATHOLYTE, TEST No. 2

CHANGES IN CONCENTRATIONS IN THE
ANOLYTE AND CATHOLYTE, TEST No. 3

TOTAL AMOUNT OF HYDROFLUORIC ACID
IN THE ANOLYTE, TEST No. 3

TOTAL AMOUNT HYDROXIDE AND AMMONIUM
FLUORIDE IN THE CATHOLYTE, TEST No. 3

ELECTROMECHANICAL CELL
VOLTAGE AND CURRENT, TEST No. 3

CONCENTRATIONS OF HYDROFLUORIC ACID (ANOLYTE) AND AMMONIUM HYDROXIDE (CATHOLYTE), TEST No. 4

ELECTROMECHANICAL CELL
VOLTAGE AND CURRENT, TEST No. 4

5,413,682

RECOVERY OF FLUORIDE FROM WASTE SOLUTIONS

FIELD OF THE INVENTION

The present invention relates to a method of recovering fluoride from a waste stream. More specifically, it relates to an electrochemical process that forms hydrofluoric acid and ammonium hydroxide by treating an aqueous waste stream containing ammonium fluoride.

BACKGROUND OF THE INVENTION

Nuclear reactors have fuel assemblies consisting of an array of individual fuel rods that contain uranium pellets. The uranium pellets are produced by pressing and sintering ceramic uranium dioxide, $UO_2$, powder. The strength and integrity of the pellets depends on the particular process used to produce the uranium dioxide powder. Ultimately, high performance in nuclear reactors depends on the microstructure of the individual particles in the manufactured uranium dioxide powder. Thus, the process selected for manufacturing uranium dioxide powder is important.

A process that produces uranium dioxide powder with exceptional microstructure characteristics for nuclear fuel pellets is the Ammonium Diuranate process. The Ammonium Diuranate process begins with hydrolysis of uranium hexafluoride gas. An aqueous mixture of uranyl fluoride, $UO_2F_2$, and hydrofluoric acid, HF, called hydrolyzed uranium fluoride, is formed. Subsequently, the hydrolyzed uranium fluoride is contacted with aqueous ammonia, $NH_4OH$, to produce an Ammonium Diuranate precipitate.

The precipitation reaction occurs in one or more stages and in the presence of excess ammonium hydroxide to promote optimal Ammonium Diuranate particle nucleation and growth. The slurry produced in the precipitation reaction is filtered or centrifuged before it is transferred to a kiln for reduction and defluorination. In the kiln, the Ammonium Diuranate precipitate is converted first to uranium oxides such as $U_3O_8$, then reduced to uranium dioxide. Ultimately, traces of fluoride are removed from the uranium dioxide powder by stripping with a small amount of steam.

While the ceramic properties of the uranium dioxide powder produced from the Ammonium Diuranate process are excellent, the conventional process produces an undesirable liquid waste stream. The liquid waste stream consists of virtually all of the water used in the various reactions above, traces of soluble and particulate uranium, excess ammonium hydroxide, and ammonium fluoride. In fact, nearly all of the fluoride originally present in the hydrolysis of uranium hexafluoride, leaves the process as ammonium fluoride.

This relatively large flow of mixed chemicals is expensive and difficult to treat. Processing methods to treat the liquids include ultrafiltration, centrifugation, ion-exchange, solvent extraction, lime precipitation, ammonia distillation, and press filtration, to mention a few.

Ammonium Diuranate treatment processes include steps to recycle uranium, other steps to recycle ammonia, and yet more steps to dispose of the fluorides by neutralizing with lime so as to produce calcium fluoride. The calcium fluoride must be sent to a landfill or disposed of by other means. Disposal of such salts is proving to be increasingly expensive because of the high cost of capital and the stringent environmental regulations.

Thus, there is a need to have an effective process for treating fluoride-containing aqueous streams. There is also a need to have a process that significantly reduces the amount of waste disposal. Finally, there is a need for a process to recover the fluoride in the waste stream and convert it into a usable and salable product.

SUMMARY OF THE INVENTION

Generally speaking, this invention fulfills these needs by providing for the recovery of hydrofluoric acid and ammonium hydroxide from an aqueous stream containing ammonium fluoride and ammonium hydroxide, comprising the step of electrolyzing the aqueous stream in an electrochemical cell having an ion-exchange membrane between an anolyte chamber and a catholyte chamber, thereby depleting the stream of ammonium fluoride, enriching the concentration of ammonium hydroxide in the catholyte chamber, and forming hydrofluoric acid in the anolyte chamber.

An important aspect of the method is an electrochemical cell which utilizes a combination of electrodialysis with an ion-exchange membrane and electrolysis to split the ammonium fluoride salt into its constituent acid, hydrofluoric acid, and its base, ammonium hydroxide.

Electrolysis is defined as the decomposition of water and other inorganic compounds in an aqueous solution by means of an electric current. The positive and negative ions formed are carried by the current to the oppositely charged electrodes, where they are collected or released. The negative charged electrode is called the cathode, and attracts positive ions. Conversely, the anode is the positive charged electrode, and attracts negative ions.

Electrodialysis is a form of dialysis in which an electric current aids the separation of substances that ionize in solution. The ions are separated by an ion-exchange membrane containing high concentrations of fixed charges. The membrane repels similarly charged ions, coions, but allows ions of the opposite charge, counterions, to pass through.

An anion-exchange membrane contains high concentrations of positive fixed charges. In anion-exchange membranes, fixed charges may be: $-NH_3^+$, $-RNH_2^+$, $-R_3N^+$, $-R_2N^+$, $-R_3P^+$, and $-R_2S^+$. In contrast, a cation-exchange membrane contains high concentrations of negative fixed charges. The following moieties are used as fixed charges in cation-exchange membranes: $-SO_3^-$, $-COO^-$, $-PO_3^{2-}$, $-HPO_2^-$, $-AsO_3^{2-}$, and $-SeO_3^-$.

A catholyte chamber houses the cathode, the negative electrode of the cell, to which positively charged ions migrate when a current is passed through the cell. An anolyte chamber contains the anode, the positive electrode of the cell, to which negatively charged ions migrate.

In the practice of this invention, where the aqueous stream is generated from the production of uranium dioxide, the aqueous stream is passed through the catholyte chamber of an electrochemical cell that has been assembled with an anion-exchange membrane. When current is passed through the cell, fluoride ions are transferred to the anolyte chamber where hydrofluoric acid is formed. The ammonium ions, which remain in the cathode chamber, form ammonium hydroxide.

In this system the ammonium hydroxide can be recycled back into the Ammonium Diuranate process. Part of the hydrofluoric acid produced can go directly from the cell to the Ammonium Diuranate process and to other plant processes where needed. Another part of the hydrofluoric acid can be combined with the ammonium fluoride remaining after the ammonium hydroxide has been removed to produce a salable ammonium acid fluoride product. Excess hydrofluoric acid can be concentrated as a salable product.

In regards to the manufacture of uranium dioxide powder, the objectives of the invention are to recycle ammonium hydroxide in the ammonium fluoride-ammonium hydroxide waste stream back into the uranium hexafluoride decomposition process, to convert the fluoride in the aqueous stream into a usable and salable product, to avoid the costs associated with precipitation of the fluoride as calcium fluoride, and to eliminate the costs of transporting and landfilling the nearly valueless calcium fluoride.

BRIEF DESCRIPTION OF THE DRAWINGS

The invention will be understood with greater clarity by reference to the accompanying drawings in which the results from experimental tests 2–4 are depicted in graph form.

DESCRIPTION OF THE INVENTION

Figure 1:
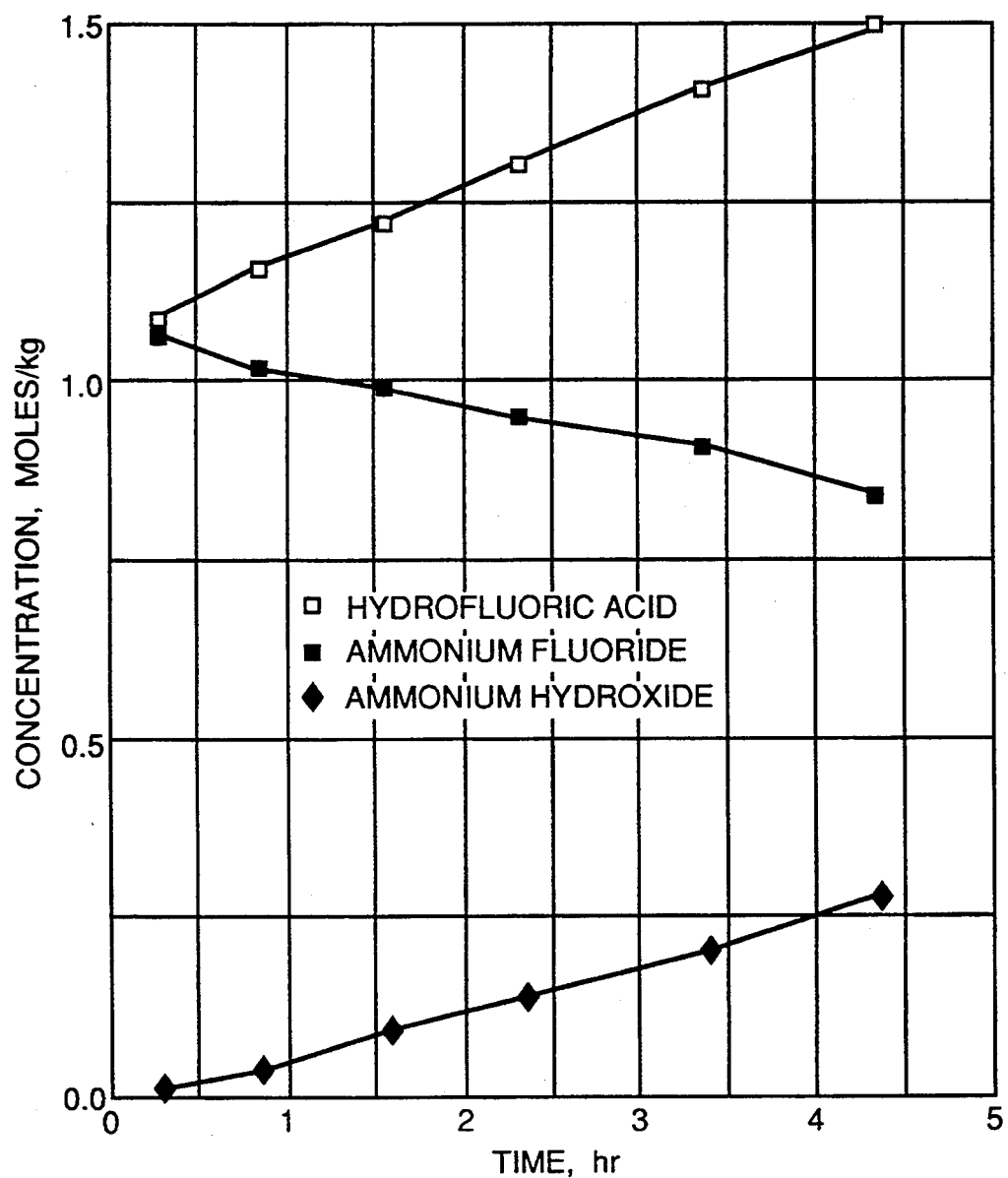
FIG. 1 is for Test No. 2 and shows the changes in concentrations of the dissolved species in the cells over time.

We have discovered systems to treat aqueous ammonium fluoride-ammonium hydroxide waste streams that recycle the ammonium hydroxide while producing fluoride-containing chemicals that have substantial commercial value. The essence of these systems is an electrochemical cell which utilizes electrolysis and electrodialysis. The process, which is electrically driven, uses ion-exchange membranes to separate and concentrate the acid and base constituents from the salt stream. The ion-exchange membrane divides the cell into two compartments, a catholyte chamber and an anolyte chamber. The ammonium fluoride salt is split into its constituent acid, hydrofluoric acid, and its base, ammonium hydroxide. The hydrofluoric acid can then be combined with the residual ammonium fluoride to form the salable product, ammonium acid fluoride.

In the system for recovering hydrofluoric acid and ammonium hydroxide from an aqueous stream, the stream flows into the cathode compartment of the cell. The ion-exchange membrane in the cell is anionic, and water is injected, as needed, into the anolyte compartment. Hydroxyl ions and hydrogen gas are generated by the cathodic breakdown of water. A substantial fraction of the fluoride ions and a small amount of water permeate through the membrane into the anode compartment. The net results of the processes in the cathode compartment are the depletion of ammonium fluoride, the enrichment of ammonium hydroxide, and the generation of hydrogen gas.

If the aqueous stream originates from the production of uranium dioxide, then the ammonium hydroxide enriched stream can be recycled for direct use in the uranium dioxide production process. Any uranium contamination in this stream is harmless to the manufacture of uranium dioxide.

In the anode compartment, water is oxidized to oxygen gas and hydrogen ions. Fluoride anions are transported across the anion-exchange membrane to the anolyte compartment. Here they combine with the hydrogen ions, resulting in a purified acid product, hydrofluoric acid. Hydrofluoric acid of at least 5 molar concentration can be produced. Part of the hydrofluoric acid can be used directly from the cell in other manufacturing processes. Excess hydrofluoric acid can be concentrated by some combination of distillation and electrodialysis to produce salable concentrated hydrofluoric acid.

Inefficiencies in the form of hydroxyl ion and hydrogen ion transport in the membrane and cross-diffusion of neutral species, increase as the concentrations of the products increase in each compartment. Therefore, an optimum system will withdraw products from each compartment at selected concentrations, based on the design of the cell and known chemical engineering principles.

Since the system is driven by electric current, as the applied current changes, so will the system efficiency. Thus, the optimum current to be applied is determined by the design of the cell. For instance, the following all have an impact on the current efficiency: electrode spacing, type of ion-exchange membrane used, the temperature of the reaction, the current density, and the concentrations of feed and product formed. The design of the cell is based on known chemical engineering principles to achieve the desired system efficiency.

The flow rate of the aqueous stream into the chamber is controlled so as to enhance mass transfer of ionic species to the electrodes and membrane. Also, the flow rate should promote turbulence within the cell. Recirculation of the product stream through the anolyte chamber is also desirable to promote turbulence and enhance mass transfer.

The process can run continuously or in batch treatments and the reaction proceeds at a temperature that is above the freezing point of the solution. Room temperature or above is best for system efficiency.

Ammonium acid fluoride can be made as a salable product utilizing the above mentioned system. After the ammonium hydroxide has been stripped out of the treated aqueous stream, the hydrofluoric acid is combined with the remaining ammonium fluoride. The electric current is adjusted so that the number of moles of residual ammonium fluoride is about equal to the number of moles of hydrofluoric acid produced in the cell. The water can then be evaporated off the dissolved ammonium acid fluoride to produce a salable product. If there is unacceptable contamination in the ammonium acid fluoride, the ammonium acid fluoride can be melt-filtered and sublimed to purify it.

This invention is not limited to the particular electrochemical cell configuration described above. Feeding the aqueous stream into the catholyte chamber with an anionic membrane has the advantages of excluding cationic uranium contaminants and ammonium ions from the hydrofluoric acid stream. However, the aqueous stream could be injected into the anolyte compartment of a cell built with a cation-exchange membrane, and water could be injected into the catholyte compartment. In this case, the anolyte would consist of hydrofluoric acid, residual ammonium fluoride, and the bulk of the water. Part of the ammonium hydroxide would be consumed by oxidation at the anode. The catholyte would be relatively pure ammonium hydroxide. Other cells utilizing both anion and cation-exchange membranes forming three compartments, and multi-compartment cells using bipolar and anion and cation-exchange membranes, can be used to simultaneously de-salt the waste stream while producing acid and base.

Tests 1–4 demonstrate the invention. Accompanying FIGS. 1–11 depict the results of tests 2–4.

Experiments have shown that an electrochemical flow cell can be used to produce ammonium hydroxide and hydrofluoric acid from ammonium fluoride and ammonium hydroxide solutions. The flowthrough electrochemical cell used for the tests was a Microflow Cell TM made by ElektroCell AB, Sweden. It was assembled with a platinum anode, an anion-exchange membrane, and a nickel mesh cathode.

Two different anion-exchange membranes were used in the tests. Membrane A is R-4030, supplied by Pall RAI, Inc. Membrane B is Neosepta ACM, made by Tokuyama Co., LTD. Membrane B proved to be more effective than Membrane A because it was a low $H^+$ transport membrane.

Other materials of construction in the cell were polytetrafluoro-ethylene (PTFE), fluorocarbon rubber, and chlorocarbon rubber. The active electrode and membrane dimensions were 3.45 cm in the upward flow direction and 3.05 cm perpendicular to the flow. The anode-to-membrane distance was 2.4 mm and the cathode-to-membrane distance was 2.7 mm. Both chambers contained polyethylene or polypropylene mesh, which acted as turbulence promoters.

The anolyte reservoir was a 150 ml polypropylene jar and the catholyte reservoir was a 250 ml spherical flask which was made of glass and had three necks. The reservoirs were capped to reduce evaporation. Tubing and connectors were made from fluorocarbon polymers. Each solution was circulated with a polytetrafluoroethylene-head pump from its respective reservoir up through one of the cell chambers and back to the reservoir. Solution flow rates were each about 200 ml per minute.

The anolyte was an aqueous solution of hydrofluoric acid and the catholyte was an aqueous solution of ammonium fluoride and ammonium hydroxide. When the solutions were circulated and current was passed through the cell, the compositions of the solutions changed. Samples were taken periodically and analyzed by titration procedures. Initial and final solutions and samples were weighed in order to calculate mass balances.

Table 1 lists the initial solution concentrations used in four tests.

TABLE 1

| TEST NO. | ANION-EXCHANGE MEMBRANE | ANOLYTE HF, mole/kg | CATHOLYTE $NH_4F$ | CATHOLYTE $NH_4OH$ |
|---|---|---|---|---|
| 1 | Type A | 4.75 | 0.45 | 0.27 |
| 2 | Type B | 0.97 | 1.07 | 0.0* |
| 3 | Type B | 0.97 | 0.52 | 0.27 |
| 4 | Type B | 4.60 | 0.53 | 0.27 |

*The solution was slightly acidic.

Results of Test No. 1:

The concentration of the ammonium hydroxide in the anolyte and of the hydrofluoric acid in the anolyte both decreased with time during application of the 200 mA current. Both concentrations increased somewhat when the current was increased to about 450 mA. If the membrane had been perfectly selective to anions, the concentrations would have increased throughout the test. This test showed that membrane A was not suitable for this system.

Figure 2:
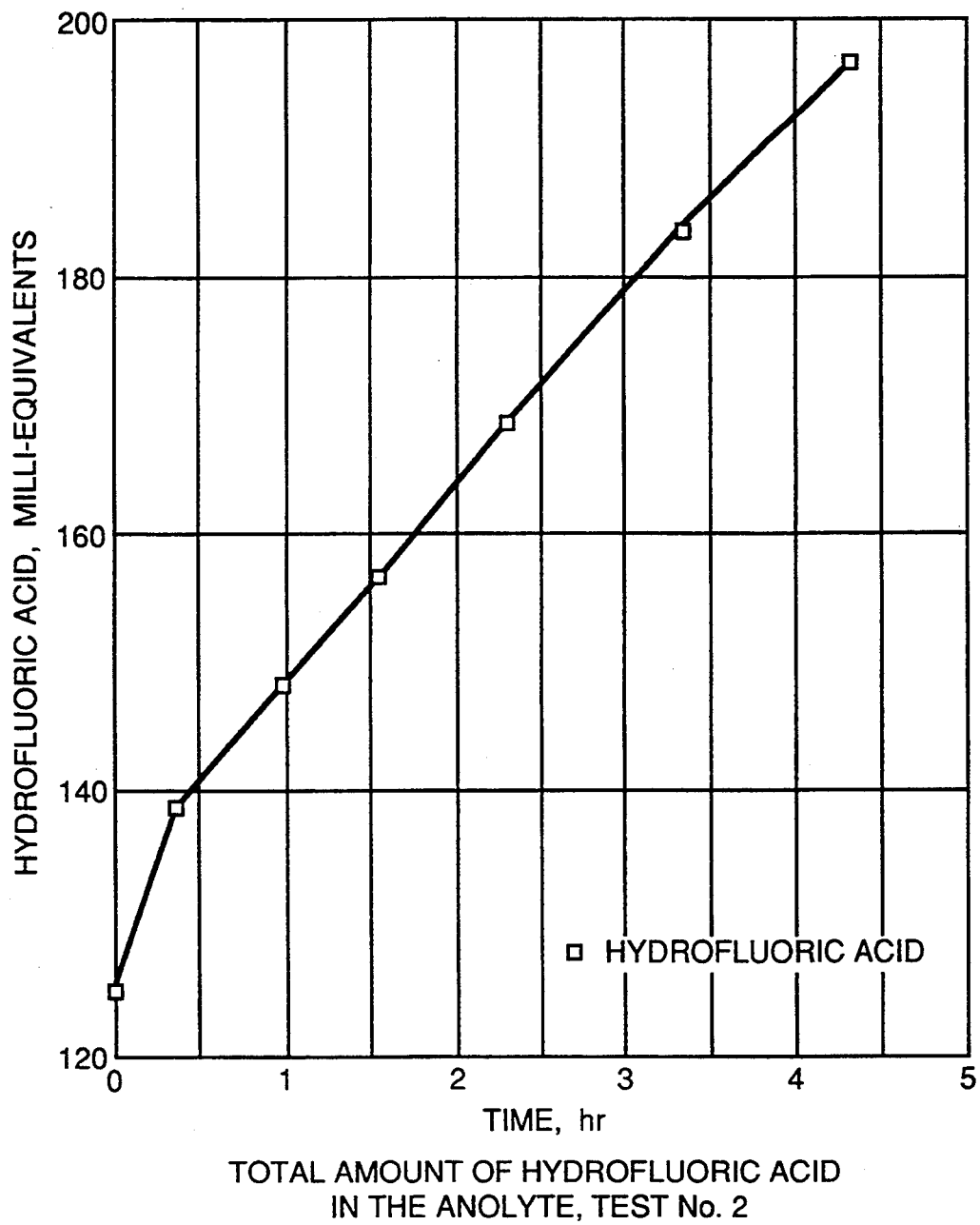
FIGS. 2–4, also for Test No. 2, calculate the total amounts of each species using solution and sample weights.
Figure 3:
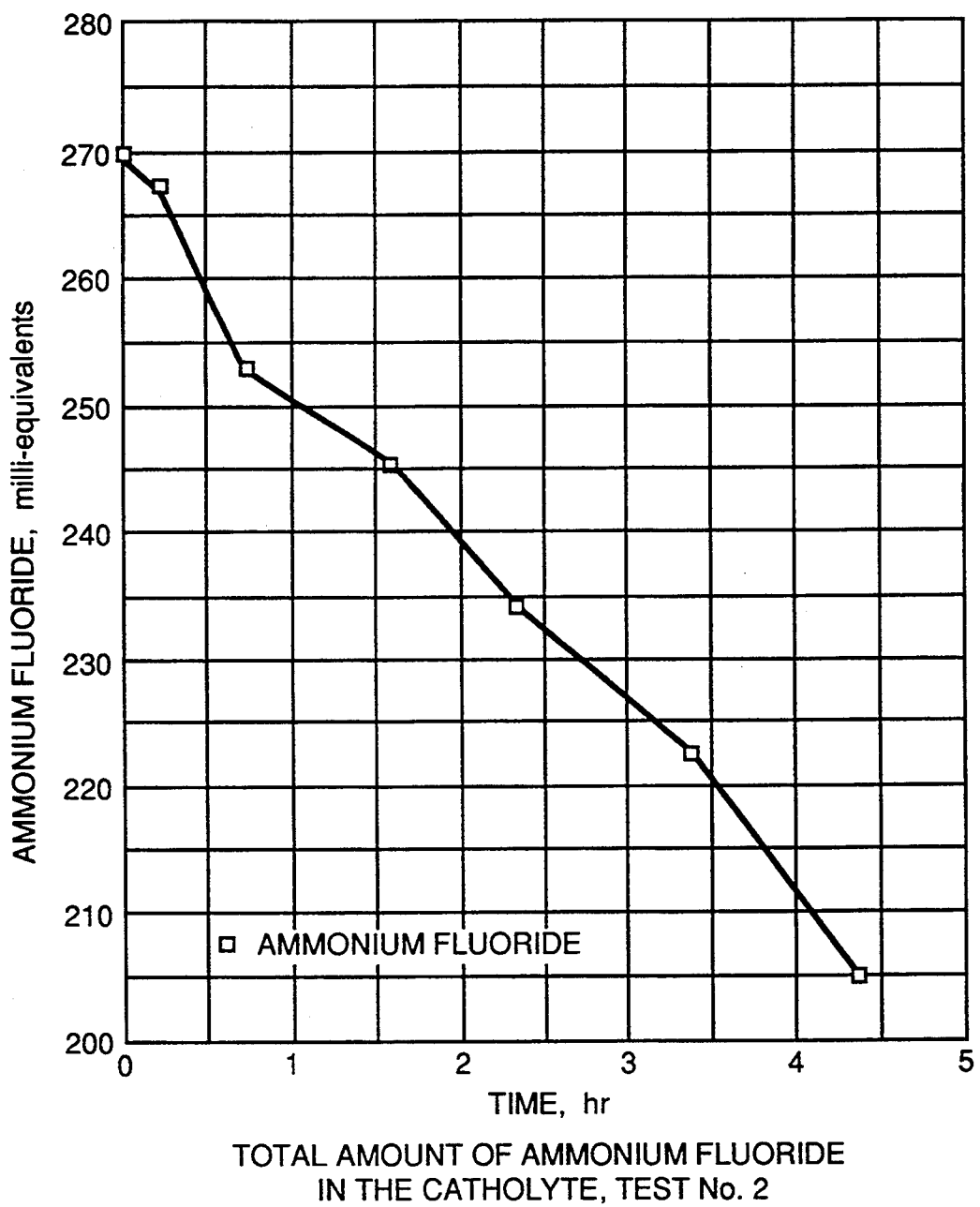
Figure 4:
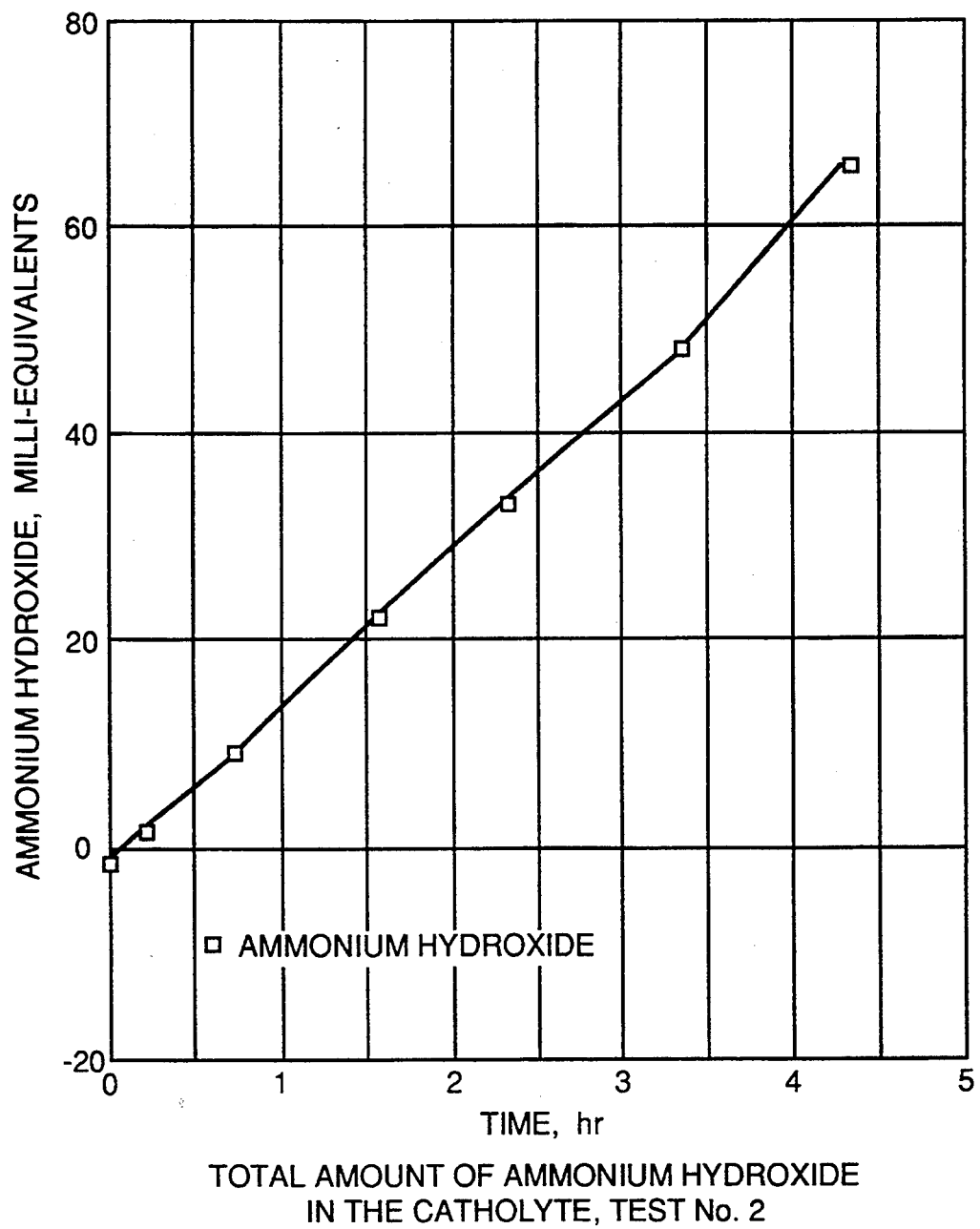

Results of Test No. 2:

FIG. 1 is a plot of the changes in concentrations of the dissolved species with time. The current was 400 mA, about 400 $A/m^2$ of electrode or membrane area. The cell voltage was 4.1 to 4.2 volts. The total amounts of each species were calculated using solution and sample weights, and the results are shown in FIGS. 2, 3, and 4. The current efficiency, defined as moles of fluoride transported across the membrane per mole of electrons passed through the cell, was close to 100%.

Figure 5:
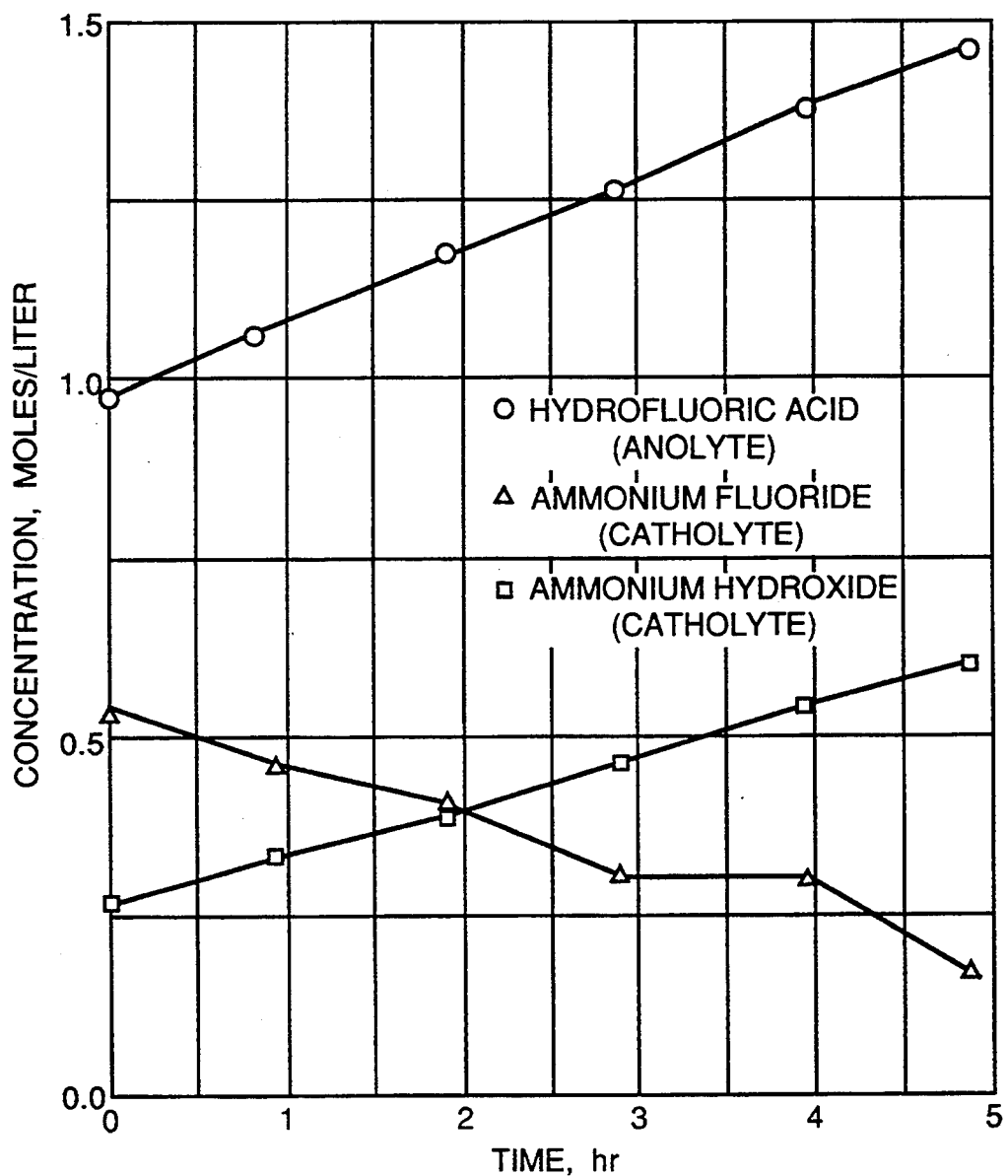
FIG. 5 is for Test No. 3 and depicts the changes in concentrations of the dissolved species during application of 400 mA current to the cell.
Figure 6:
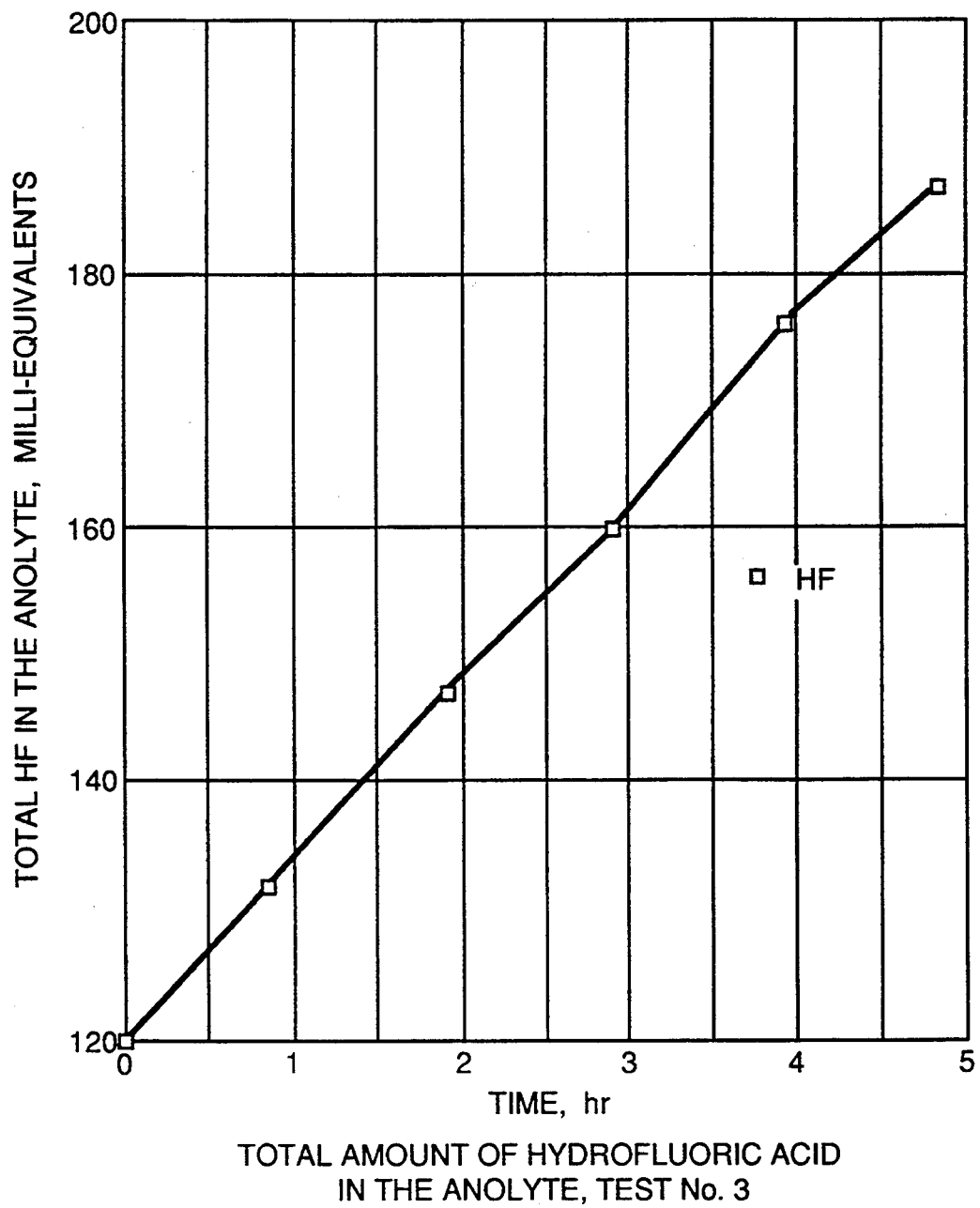
FIGS. 6 and 7, for Test No. 3, plot the total amounts of dissolved species in the anolyte and catholyte.
Figure 7:
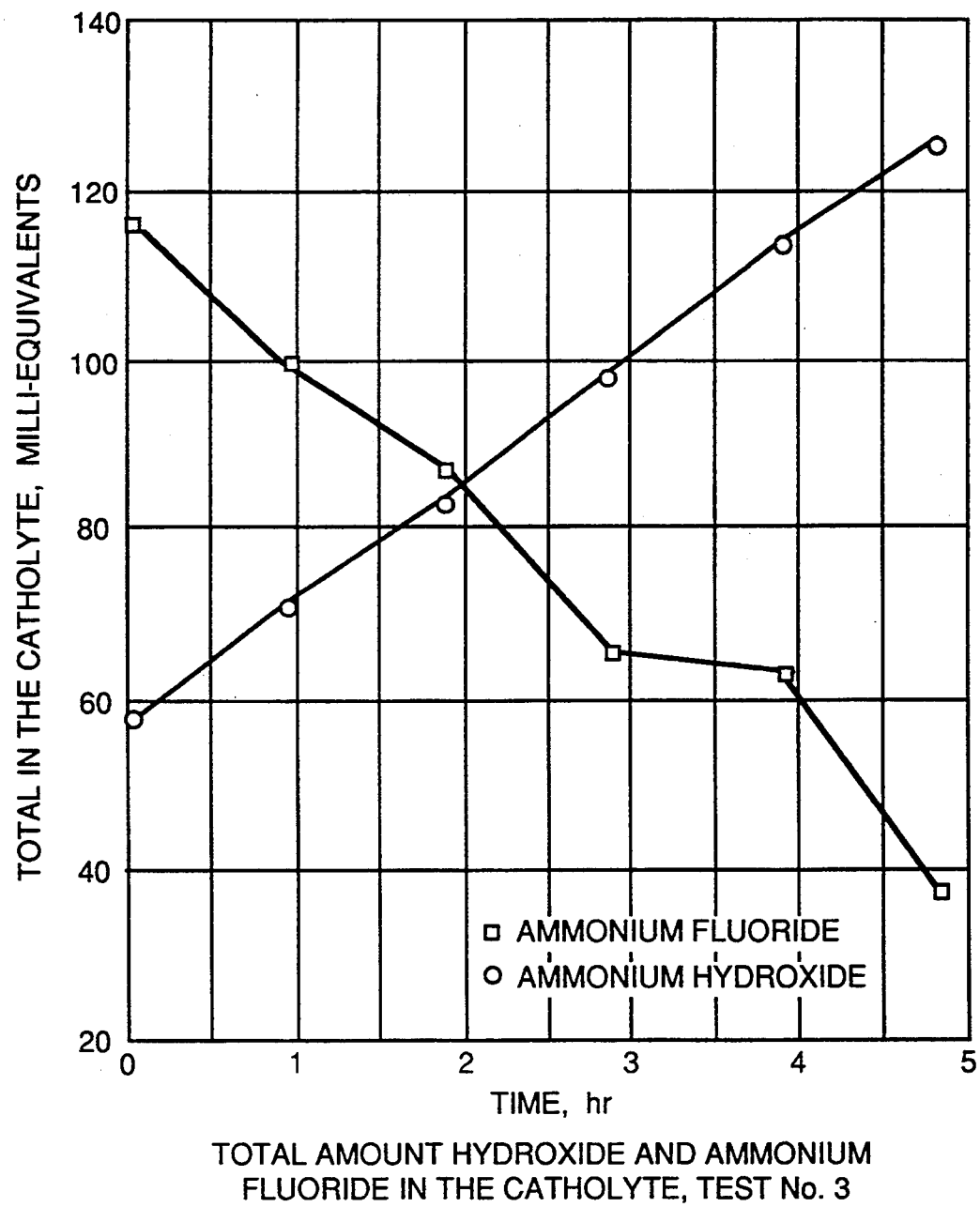
Figure 8:
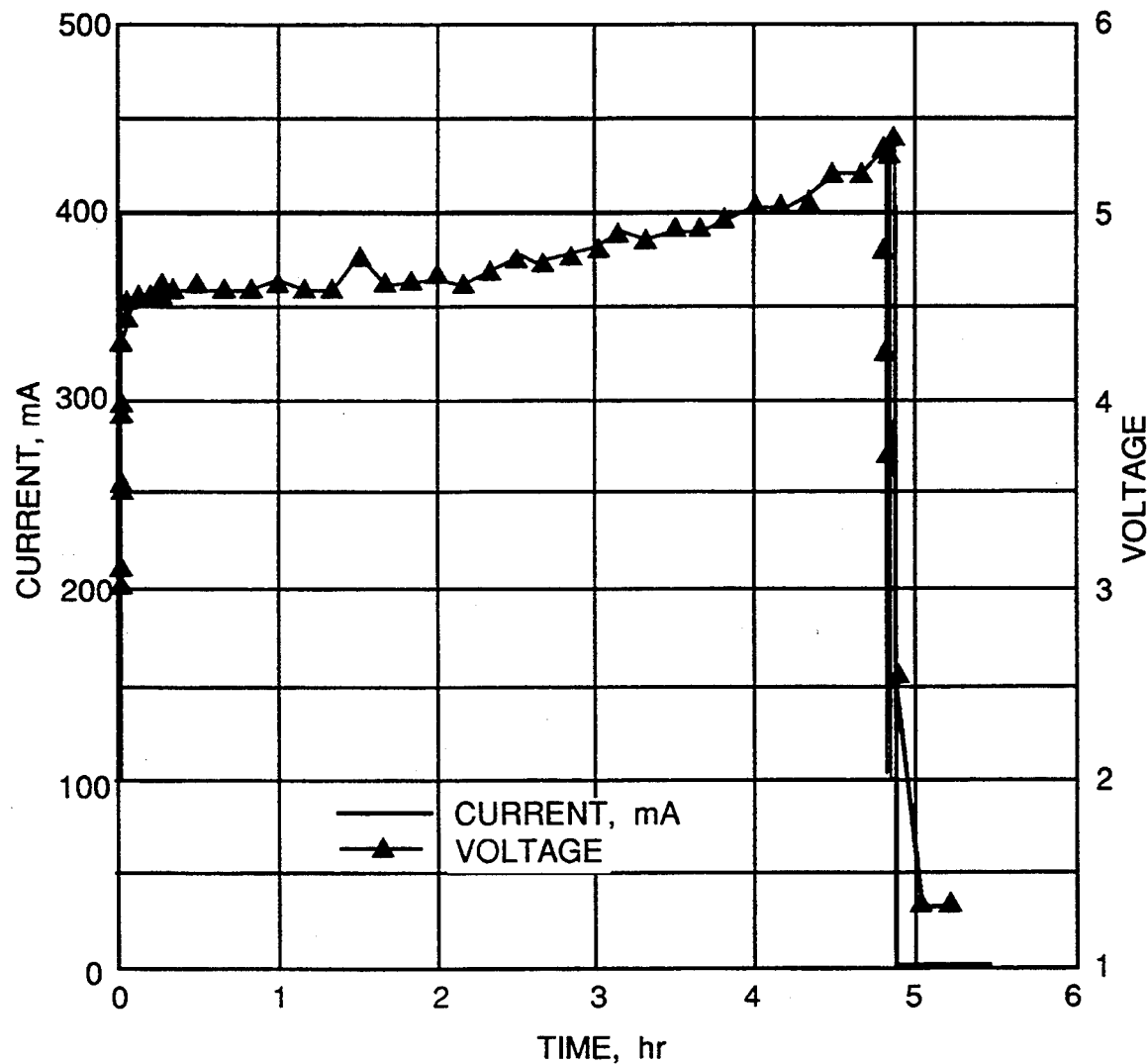
FIG. 8, for Test No. 3, plots the voltage and current of the electrochemical cell.

Results of Test No. 3:

The changes in the concentrations of the dissolved species during application of 400 mA current to the cell are shown in FIG. 5. The total amounts of dissolved species in the anolyte and catholyte are shown in FIGS. 6 and 7. The voltage and current of the electrochemical cell are plotted in FIG. 8. The average current efficiency for this test was 92%.

Figure 9:
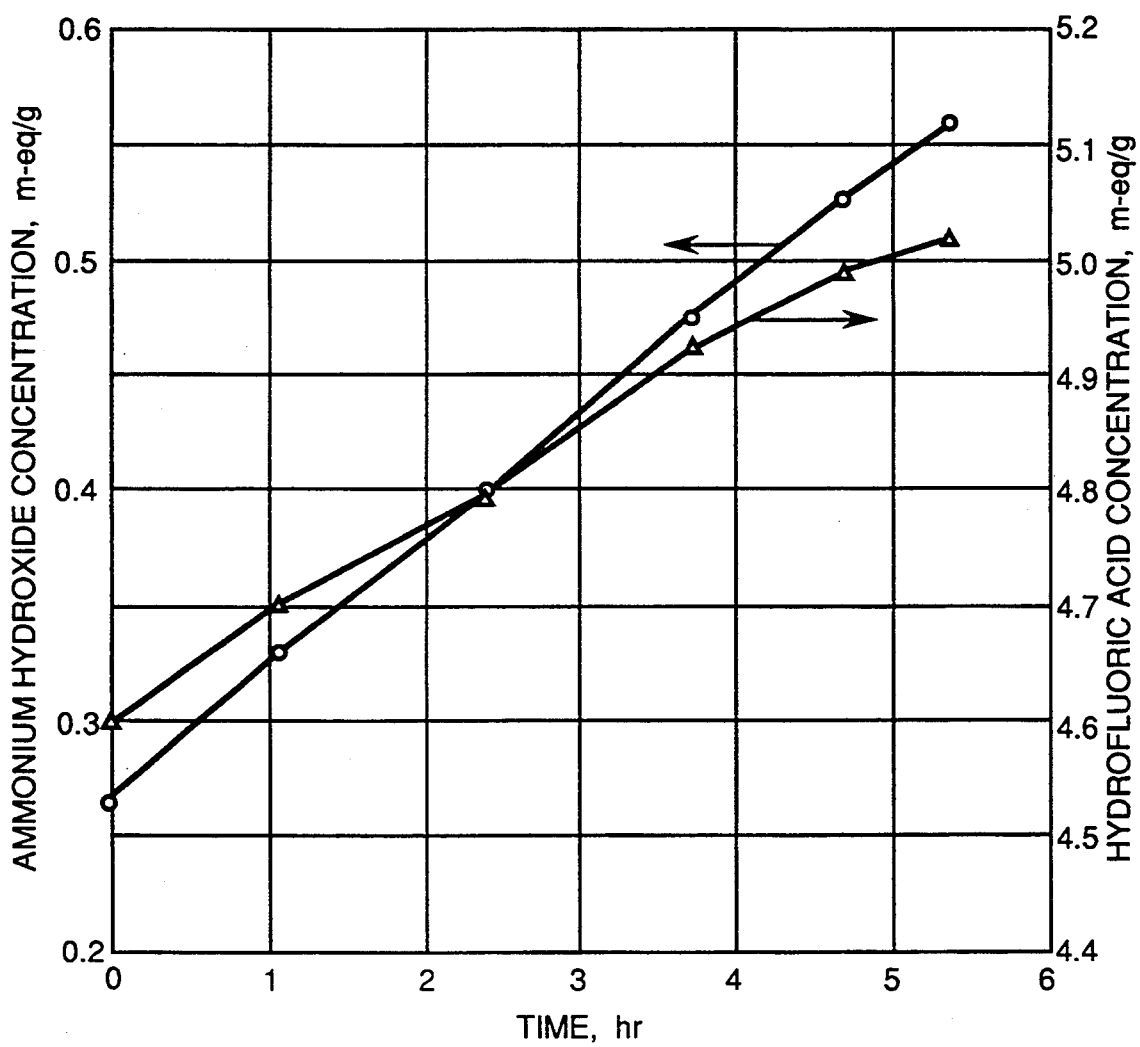
FIG. 9, for Test No. 4, shows the changes in the concentrations of hydrofluoric acid and ammonium hydroxide during the test.
Figure 10:
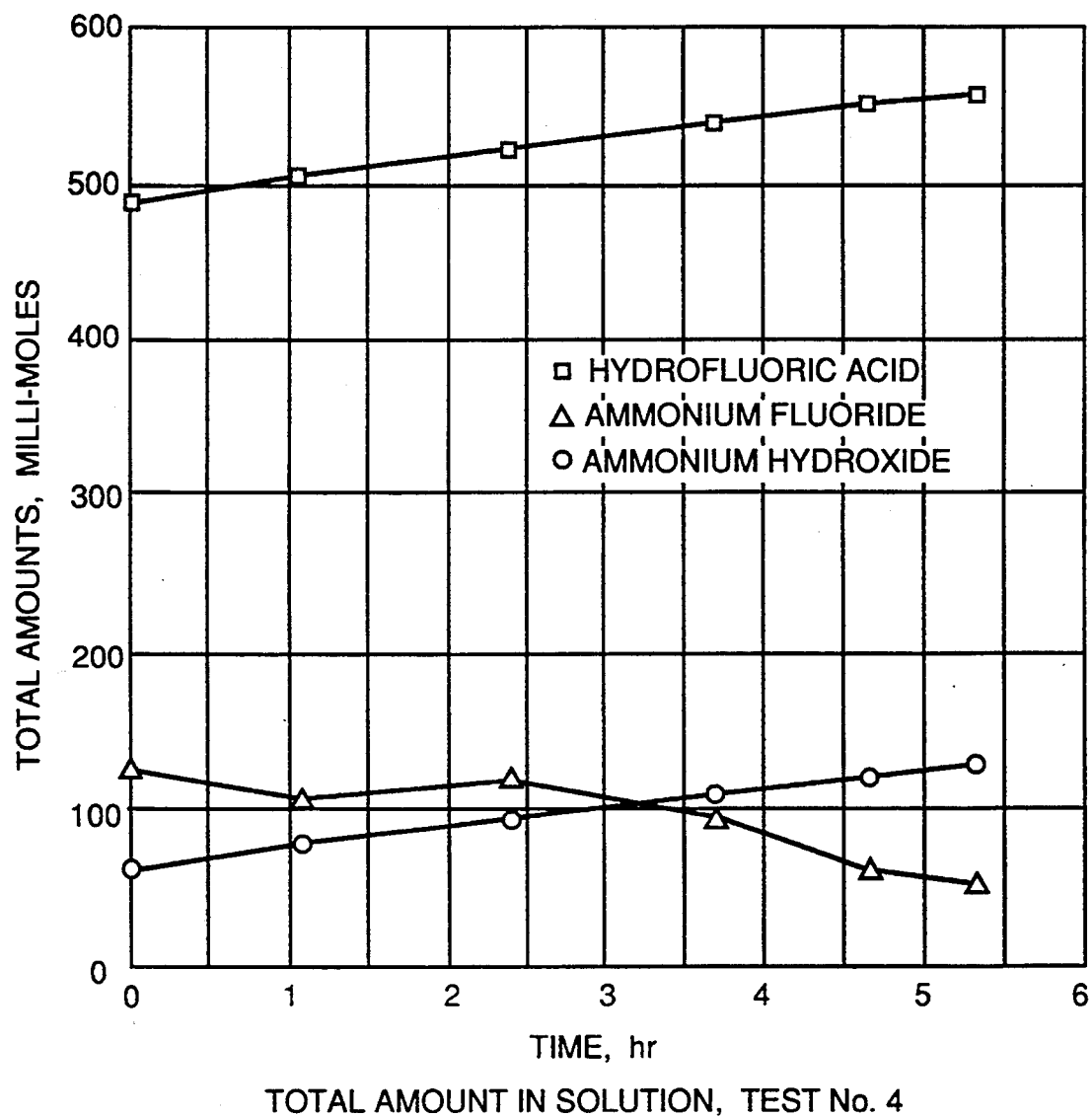
FIG. 10, for Test No. 4, plots the changes in the dissolved species.
Figure 11:
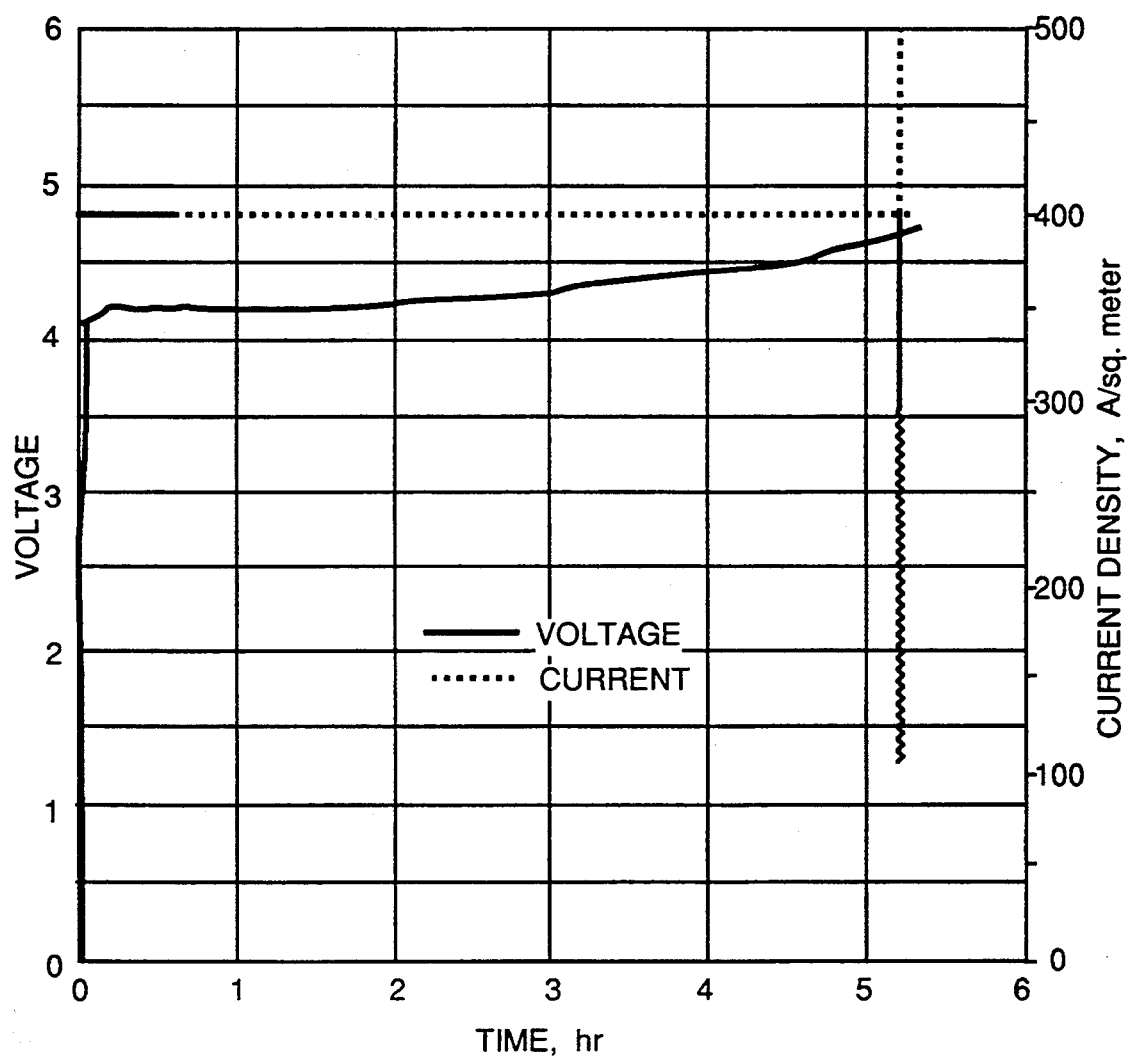
FIG. 11 depicts the electrochemical cell voltage and current.

Results of Test No. 4:

FIG. 9 shows the changes in the concentrations of hydrofluoric acid and ammonium hydroxide during this test. The changes in total amounts of hydrofluoric acid, ammonium fluoride, and ammonium hydroxide are plotted in FIG. 10. Electrochemical cell voltage and current are shown in FIG. 11. The average current efficiency for this test was about 83%. The decline in efficiency to about 65% at the end of the test was probably due to increasing hydroxyl ion transport in the membrane as the ammonium hydroxide concentration increased, and to increasing hydrogen ion transport in the membrane as the hydrofluoric acid concentration increased. This test demonstrated that hydrofluoric acid of at least 5 molar concentration can be produced in this type of electrochemical cell.

What is claimed is:

1. A method for treating a waste stream containing ammonium fluoride and ammonium hydroxide from a production line for uranium dioxide comprising the steps of:

feeding the waste stream into an electrochemical cell having an ion-exchange membrane between an anolyte cell and a catholyte cell;

electrolyzing the stream by passing current through the cell to form an enriched concentration of ammonium hydroxide in the catholyte cell and to form hydrofluoric acid in the anolyte cell having at least 5 molar concentration.

2. A method according to claim 1 wherein the enriched concentration of ammonium hydroxide is recycled into the production line for uranium dioxide.

3. A method according to claim 1 wherein the ion-exchange membrane is an anion-exchange membrane and the waste stream is initially passed through the catholyte cell.

4. A method according to claim 1 wherein the ion-exchange membrane is a cation-exchange membrane and the waste stream is initially passed through the anolyte cell.

5. A method to form ammonium acid fluoride from a waste stream containing ammonium fluoride and ammonium hydroxide from a production line for uranium dioxide, comprising the steps of:

feeding the waste stream into a catholyte cell of an electrochemical cell with an anion-exchange membrane;

passing current through the cell to partially deplete ammonium fluoride from the waste stream in the catholyte cell, thereby enriching the concentration of ammonium hydroxide in the catholyte cell and forming hydrofluoric acid in an anolyte cell;

recycling the ammonium hydroxide into the production line for uranium dioxide; and combining about equal moles of hydrofluoric acid and about equal moles of residual ammonium fluoride remaining in the catholyte cell, so as to produce ammonium acid fluoride.

* * * * *